United States Patent [19]

Stark

[11] 3,990,141
[45] Nov. 9, 1976

[54] METHODS OF MAKING DYNAMOELECTRIC MACHINE STRUCTURES

[75] Inventor: William H. Stark, Fort Wayne, Ind.

[73] Assignee: General Electric Company, Fort Wayne, Ind.

[22] Filed: Mar. 3, 1975

[21] Appl. No.: 554,454

[52] U.S. Cl. .................................. 29/596; 29/447; 310/42; 310/51; 310/91
[51] Int. Cl.² ........................................ H02K 15/14
[58] Field of Search ............ 29/596, 598, 447, 517; 310/42, 90, 91, 51; 308/163, 127, 132, 237 A

[56] References Cited
UNITED STATES PATENTS

| | | | |
|---|---|---|---|
| 2,947,893 | 8/1960 | Bussone | 310/90 |
| 3,786,561 | 1/1974 | Busian | 29/598 |
| 3,793,543 | 2/1974 | Stokke | 310/90 |
| 3,827,134 | 8/1974 | Wechsler | 29/252 |
| 3,868,767 | 3/1975 | Brunschwig et al. | 29/598 |

OTHER PUBLICATIONS

*Star Tolerance Rings*, published by Roller Bearing Co. of America, 1961, (p. 1 relied on).
*The Longer Life Motors*, published by General Electric, Oct. 1972, (pp. 4 and 6 relied on).

*Primary Examiner*—Carl E. Hall
*Attorney, Agent, or Firm*—Ralph E. Krisher, Jr.

[57] ABSTRACT

Shaft material of a given desired nominal diameter corresponding to a nominal desired shaft extension diameter for a particular motor is selected; shaft blanks are cut; optional operations such as chamfering and washing, grinding, machining of at least one flat and phosphatizing to inhibit rust are performed; a first accessory member is assembled in a predetermined position by heat shrinking; a rotor body is assembled with shaft; and a second accessory member is assembled by heat shrinking. For ball bearing applications, a person practicing the invention in one form may finish turn concentric journals on accessory members for the inner races of bearings after accessory members have been assembled with a shaft so that inner races of ball bearings may be lightly pressed onto the journals, and the rotor is assembled with end frames and stator. The concentric journals permit a press fit of ball bearings without substantially exceeding .0005 of an inch press fit and thus damage of the bearings is avoided.

One preferred method includes stressing shaft portions and maintaining the stressed condition to increase stiffness of a rotor system and thereby increase the rotor system resonant frequency. Apparatus disclosed herein includes means for maintaining a desired perpendicular relationship between a shaft and various parts assembled therewith. Such apparatus assists in establishing desired dimensional relationships. In one exemplification, it is preferred to use aluminum collars that conform to a shaft surface and thus establish a more thorough and uniformly stressed condition of the shaft.

9 Claims, 15 Drawing Figures

METHODS OF MAKING DYNAMOELECTRIC MACHINE STRUCTURES

BACKGROUND OF THE INVENTION

The present invention relates generally to rotatable dynamoelectric machines, and, more particularly, to rotatable assemblies usable therein, and to methods for making the same.

Shafts of rotary dynamoelectric machines, such as fractional horsepower electric motors of both ball and sleeve bearing types, often are machined from shaft stock that initially is of a relatively large diameter. Extensive machining of large diameter shaft stock often has been required, even though one or more external shaft extensions are required to be of a small diameter. In some cases, large diameter stock is used so that intermediate diameter seats, and large diameter shoulders may be provided thereon for ball bearings. Moreover, in the case of shafts designed to accommodate ball bearings, a groove may be required adjacent the ball bearing seat to provide clearance for the inner race of the bearing.

Some sleeve bearing motors are provided with straight shafts, i.e., shoulders, steps, etc. are not normally provided. However, for other sleeve bearing motors, it has sometimes been necessary to provide enlarged shafts in order to increase the stiffness thereof, and machine the shaft extensions to a smaller, acceptable size. This usually is done in order to avoid vibration and noise problems when either the horsepower of a motor or the distance between bearings is increased.

Although the above problems may be encountered with different motors having different diameter shaft extensions, the problem as it pertains to motors having one-half inch (12.7mm) diameter shaft extensions will now be set forth in more detail.

For some ball bearing motors with a one-half inch diameter shaft extension, it has been necessary to machine the shaft from three-quarter inch (19mm) diameter stock. In these cases, multiple machining operations have been performed on each end of the shaft to provide a central shaft portion that remained three-quarter inches (19mm) in diameter, machined seats for a ball bearing [e.g., for a ball bearing with an inner race diameter of about .590 inch (15mm)]; and one-half inch (12.7mm) shaft extensions.

On the other hand, for some sleeve bearing type motors that required a nominal one-half inch (12.7mm) shaft extension, one-half inch diameter ends have been machined on a five-eights inch (15.9mm) diameter shaft to provide bearing journals and one or more shaft extensions of the desired one-half inch (12.7mm) size. Five-eights inch (15.9mm) diameter shaft material has been used so that the unsupported length of the shaft between the bearings would be stiffer and have less tendency to bend or whip during operation and thus generate less noise (as compared to a one-half inch (12.7 mm) straight shaft). As will be understood, such noise is objectionable because it may be transmitted to the environment directly, or through the structural mechanisms that are interconnected with either the motor shaft or the motor shell. In other one-half inch (12.7mm) shaft, sleeve bearing motor applications, the axial length of the rotor, and unsupported shaft length have been sufficiently small that one-half inch (12.7mm) shaft material has been used with no particular problem.

In large volume production operations, the need to produce different shafts because of different rotor lengths or bearing types increases manufacturing costs not only due to extra material usage and machining operations; but also because of extra capital investment for machining equipment and because of the expense associated with maintaining different types of production equipment.

Still another expense associated with the use of differently sized shafts is more directly related to the manufacture of the rotor body. It should be recalled that squirrel cage rotors for induction motors are made up of laminations that have a centrally located bore for accommodating the shaft. All of the above specifically described motors typically would have rotors with a common outer diameter. However, laminations for each different motor would have a shaft receiving bore of one-half inch (12.7mm), five-eights inch (15.9mm), or three-quarters inch (19mm), depending on the diameter of the central portion of the shaft.

It should now be understood that it would be extremely desirable to provide new and improved rotor arrangements, and methods and apparatus for making the same, that can be utilized to overcome any one or more of the above mentioned problems.

Accordingly, it is a general object of the present invention to provide improved rotor arrangements and methods for use in making the same, as well as dynamoelectric machines including such rotor arrangements, so that the above-identified and other problems may be overcome.

It is a more specific object of the present invention to provide a new and improved rotor assembly whereby motors that require a given single diameter shaft extension may utilize straight shafts of a minimum diameter even for ball bearing or long rotor applications that have previously required stepped or otherwise machined shafts.

Still another object of the present invention is to provide new and improved methods for use in manufacturing rotors that may be used in either sleeve or ball bearing applications.

It is a more specific object of the present invention to provide a new and improved rotor assembly wherein accessory means, assembled on a straight shaft so as to form part of the rotor assembly, satisfy the previous need for stepped shafts.

It is yet another general object of the present invention to provide new and improved methods for assembling accessory means with substantially straight shafts.

SUMMARY OF THE INVENTION

In carrying out the above and other objects of the present invention in one form thereof, I select shaft material of a given desired nominal diameter corresponding to the nominal desired shaft extension diameter for a particular motor. Thereafter, I cut the shaft blanks and carry out, when desired, optional operations such as chamfering and washing of the shaft blank. One preferred method also includes grinding, machining at least one flat, treating to inhibit rust (e.g., phosphatizing), assembling a first accessory member in a predetermined position on the shaft (preferably by heat shrinking), assembling a rotor body with the shaft, and assembling a second accessory member on the shaft (again, preferably, by heat shrinking).

If the rotor assembly is to be utilized in a sleeve bearing application, a more preferred method includes the assembly of thrust members with the shaft, and thereafter assembly of the rotor assembly with the stator and end frames of the motor. On the other hand, if the rotor is to be utilized in a ball bearing application, I finish turn concentric journals on the accessory members for the inner races of such bearings after the second accessory member has been assembled with the shaft. Thereafter, I press the inner races of the ball bearings onto the journals and then assemble the rotor with parts such as end frames and a stator to form a complete motor. The concentric journals permit more to press fit ball bearings thereon without substantially exceeding a 0.0005 of an inch press fit and thereby avoid damaging the bearing units.

In the case of rotor assemblies that are to be used for sleeve bearing motors (and optionally for some that are to be used for ball bearing motors), a preferred method includes stressing the shaft portions that extend from a location proximate to the face of the rotor body to a location proximate to a bearing supported portion thereof, and maintaining the stressed condition of the shaft. I maintain the stressed condition of the shaft even after assembly of the motor has been completed so as to increase the stiffness of the rotor system, and thereby increase the resonant frequency of the rotor system.

Apparatus for practicing the invention may include means for maintaining a desired perpendicular relationship between a first accessory member and a shaft while the two are being assembled together. The same or other apparatus also includes (preferably) means for establishing a first dimensional relationship between the face of a rotor body and the first accessory member while the rotor body is being assembled to the shaft. The same or other apparatus also preferably would be utilized to establish and maintain a desired dimensional relationship between the first and second accessory members as the second accessory member is assembled on the shaft.

When my invention is practiced in one preferred form, accessory members are produced from aluminum or aluminum alloy, heated to a temperature in a predetermined temperature range such as 400° to 700° F. (204° to 371° C), slipped onto a steel shaft, and thereafter cooled so that the accessory members will shrink about the shaft as they cool to ambient, and tightly grip and stress the surface of the shaft. It is preferable that a material such as aluminum be selected so that it will conform to the shaft surface and establish a more thorough and uniformly stressed condition of the shaft. However, steel accessory members may be used although my preferred approach provides results that are believed to be generally unexpected and surprisingly advantageous. The auxiliary members extend from a location proximate to the end face of a rotor body, to a position proximate to the portion of the shaft that is to be supported by a bearing. Furthermore, the auxiliary members are each shrunk with a predetermined interference fit, and the members may include a bearing surface. In one form, such surface is a face against which a thrust runner may bear. In another form, such surface is a seat for a ball bearing.

When a ball bearing seat is provided, a ball bearing inner race is pressed onto the seat. In yet another form of the invention, collars are used that provide a shoulder and seat for a ball bearings without stressing the entire unsupported span of shaft between the rotor body and bearing location. When constructions according to the above-described forms are provided, it is preferable to establish sufficiently tight fit that the collars are not dislodged during subsequent handling or manufacturing operations.

BRIEF DESCRIPTION OF THE DRAWINGS

The subject matter which I regard as my invention is particularly pointed out and distinctly claimed in the concluding portion of this specification. The invention itself, however, together with further objects and advantages thereof, may be better understood by reference to the following description taken in conjunction with the accompanying drawings in which like reference numerals have been used to identify the same parts, and in which:

DESCRIPTION OF THE PREFERRED EMBODIMENTS

Figure 1:
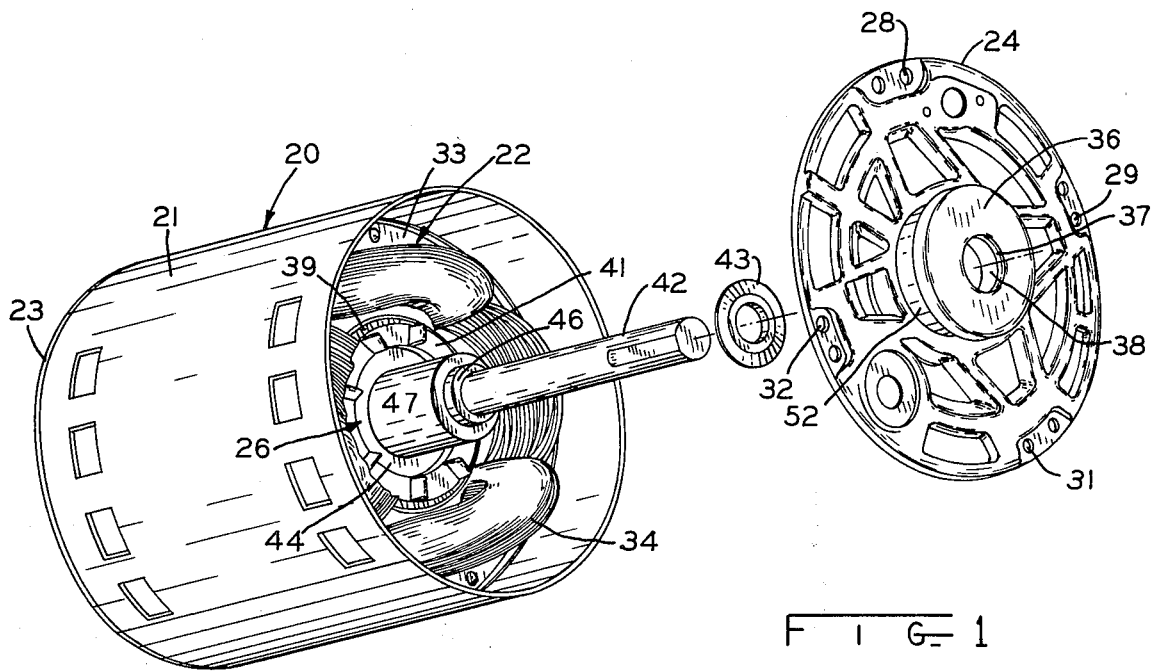
FIG. 1 is a partially exploded perspective view (with parts broken away and other parts removed) of a motor that includes structures embodying the present invention in one form thereof, such structures having been made according to preferred forms of the invention and by using apparatus disclosed herein.

In FIG. 1, an electric motor 20 has been illustrated to exemplify structures, embodying the invention in one form thereof, that may be made by practicing my invention with or without apparatus disclosed herein.

The motor 20 includes a conventional shell or housing 21 which accommodates a stator assembly 22, and also includes a pair of end frames or shields 23, 24, and a rotor assembly 26. Means for mounting motor 20 to a base, appliance, or other structure have not been shown, but it will be understood by persons skilled in the art that mounting rings may be placed on a hub 52 carried by each end shield 23, 24, and that such rings may then be disposed in any suitable cradle or base member. Alternatively, motor 20 may be provided with axially projecting studs on either of the end frames, or not shown clamp bolts (which pass through end frame holes 28, 29, 31, 32) may be used fo motor mounting purposes. The description provided herein of various approaches for mounting motor 20 is for purposes of description only and any other desired mounting approach may be followed.

Also for purposes of the description rather than limitation, it should be noted that the stator assembly 22 includes a four-pole shaded salient pole magnetic iron core 33 and four concentrated coil excitation windings 34 (it being noted that one of these has been broken away for purposes of illustration). Moreover, the end frames 23, 24 have been shown as two aluminum die cast members that are identical to one another, even though motor 20 is a single shaft extension motor. Cover 36 is provided with a central shaft admitting aperture 37 but the corresponding cover for end frame 23 is not provided with a similar aperture.

As will be understood, the end frames 23, 24 are each provided with a seat which accomodates a bearing; and the covers 23, 24 in fact each have a sleeve bearing 38 assembled therewith. However, it also will be understood that the bearing hubs of the end frames used in a motor intended for use in a different application may seat the outer race of a ball bearing.

The rotor assembly 26 includes a rotor body 39 which comprises a laminated magnetic core and cast aluminum conductors which are short circuited with one another at each end by cast aluminum end rings 41, all as will be understood. The rotor body 39 may be secured to the shaft 42 by heat shrinking or by other means, e.g., by an adhesive, by a mechanical press fit, mechanical deformation of end laminations against the shaft, and so forth. Rotor assembly 26 includes a thrust runner 43 which is normally pressed onto shaft 42, but which is removed therefrom in FIG. 1 for purposes of illustration. Thrust runner 43 is made of graphite impregnated nylon, e.g., "Nylation" as sold by the Polymer Corporation, but any other suitable low friction material may be used. Also included, as part of rotor assembly 26, are two accessory members which are heat shrunk onto shaft 42 so as to stress at least that portion of the shaft material along the surface of the shaft. One of these members is shown in FIG. 1 as an aluminum collar 47. The portion of the shaft 42 that extends from an axial location on the shaft that is proximate to the face 44 of rotor body 39 to an axial location that is proximate to the end face 46 of collar 47 is held continuously in compression during all normal temperature conditions, due to the hoop tension in collar 47. Arrangements embodying the invention thus far described provide advantageous results in terms of motor generated noise during operation of motor 20. These improved results are presently believed to be due to the stressed condition of the shaft (as just described) at each end of rotor body 39; and also perhaps due to some increase in shaft strength due to the mass of collar 47. Since these beliefs and present understanding are discussed in more detail hereinbelow, it is only noted further at this point that collars 47 and 48 (see FIG. 4) were machined from 2011-T3 aluminum, that shaft 42 was made from cold drawn low carbon steel; (e.g., one having an AISI designation of C1211 to C1215) and that collars 47, 48 were heated to a temperature in the predetermined temperature range of 400° to 700° F (204° to 375° C) before they were relatively slipped along shaft 42 (while the shaft was held at room ambient temperature at about 21° C) to predetermined axial locations, and allowed to shrink against the shaft at such locations.

The degree to which the collars must be heated may vary, depending on the material from which the collars are made, the diameter of the shaft, and the bore diameter of the collars. I have found it preferable to size the bore of collars (that are to fit on one-half inch or 12.7mm shafts) so that there would be an interference fit on the shaft of from about .0009 inch to 0.0020 inch (0.0228 mm to 0.0508 mm). More specifically, I have obtained entirely satisfactory results when the collar bore diameter has been machined to a tolerance of 0.4987 inch (12.67mm) maximum and 0.4980 inch (12.65mm) minimum; and the shaft diameter has been held to a dimension within the range of from 0.4995 inch (12.69mm) to 0.5000 inch (12.7mm).

Exact dimensions have now been described for the purpose of providing a full and complete teaching, but it should be understood that departures could be made therefrom while still utilizing my invention. When the various parts are made of the materials described hereinabove and dimensioned as noted, I have found that the collars 47, 48 (after cooling to room ambient) can be moved along shaft 42 only by applying a push-off force of from about 1,500 to about 3,500 pounds (680 kg. to 1,590 kg.).

When the shaft stress is to be caused by the shrinking of collars thereon (or by the expansion of a previously cooled shaft against the bore of a room ambient collar), the amount of heating or cooling of one part relative to the other may be readily calculated by using the well known relationship: $(\Delta T) (D) (k) = \Delta D$; here $k$ is the coefficient of thermal expansion of the material that is being heated or cooled, $\Delta T$ is the temperature difference (or gradient) under consideration, and $\Delta D$ is the change in diameter due to the change in temperature.

Figure 4:
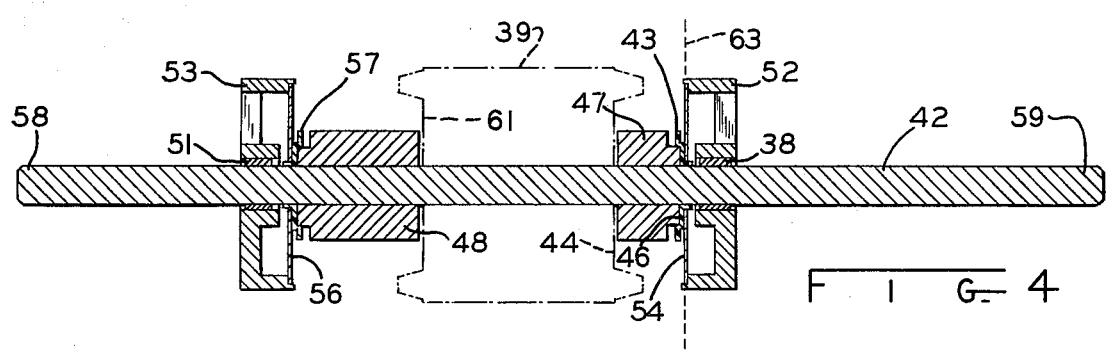
FIG. 4 is a view in elevation, with parts removed and parts in phantom, of part of the motor of FIG. 1.

With reference now to FIGS. 1 and 4, it is noted that, after final assembly of the motor 20, the shaft 42 is received in a pair of sleeve bearings 38, 51 which are carried by hubs 52, 53 of end frames 24, 23 respectively. Also shown in FIG. 4 are parts of thrust systems which include thrust plates 54, 56, and the thrust runners 43, 57. It will be understood that the thrust runners have both a lubricant slinger portion and a thrust washer portion. Details of arrangements such as these are now available elsewhere (e.g., in commonly owned J. Stokke et al U.S. Pat. No. 3,793,543, which is issued February 19, 1954 and the entire disclosure of which is incorporated herein by reference), and detailed discussions pertaining thereto will not be repeated herein.

With reference to FIG. 4, the spatial relationships between the shaft 42, collars 47, 48, rotor body 39, and bearings 38, 51 should be noted. It will be appreciated that the rotor body 39 is secured to the shaft 42 between first and second ends 58, 59 thereof, and that accessory members (in the form of collars 47, 48) are positioned on the shaft so that they each extend axially from a first axial location on the shaft (adjacent a face 44 or 61 of the rotor body) toward an end of the shaft. The collars thus each extend to a respective second or third axial location on the shaft. Each collar has a surface region (e.g., face 46 of collar 47 against which the thrust runner 43 abuts) that is disposed adjacent the respective second (or third) axial location. More specifically, such surface region is located so that it may be disposed closely proximate to a plane that is normal to the axis of the shaft 42 and passes through (or closely adjacent to) bearing means that support the shaft. For example, and as can be quickly ascertained from a review of FIG. 4, the face 46 is closely proximate to a plane represented by the dashed line 63. It is again emphasized that the shaft 42 is in a compressed (and therefore stressed) condition along the surface region that is grasped by the collar 47. In order to provide a frame of reference for "closely proximate", it is noted that the normal spacing between the face 46 and the end of the hub 52 (and therefore the bearing 38) is only on the order of about one-eight of an inch (3.17mm) for motor 20.

Figure 2:
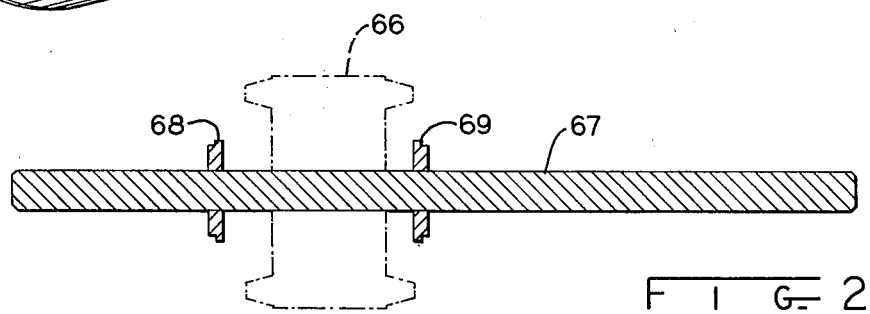
FIGS. 2 and 3 are schematic representations of prior constructions.
Figure 3:
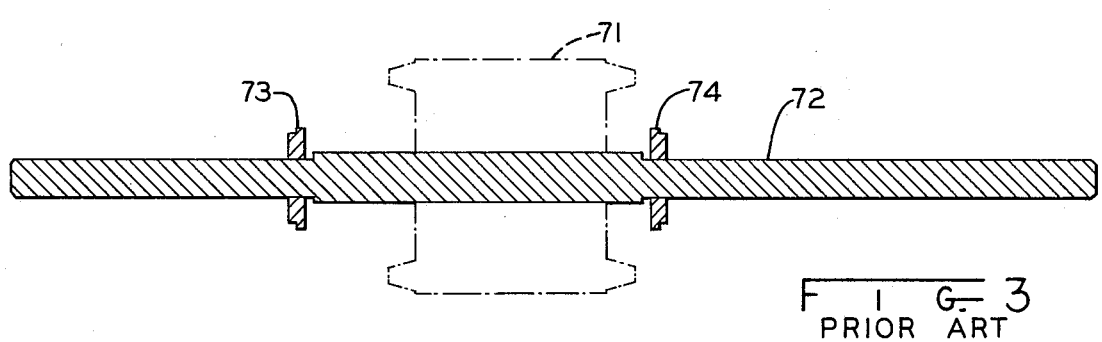

FIGS. 2 and 3 illustrate constructions that have been used long prior to the present invention. More specifically, FIG. 2 illustrates an arrangement wherein a rotor body 66 of conventional construction is heat shrunk onto a straight steel shaft 67 and two aluminum thrust collars 68, 69 (with bore dimensions as set out above for collar 47) are heat shrunk onto the shaft 67. The faces of the collars 68, 69 have been used, to provide faces against with thrust runners substantially identical to the thrust runners 43 were pressed. FIG. 3 shows yet another prior approach wherein a rotor body 71 was heat shrunk onto steel shaft 72. Again, aluminum collars 73, 74 were heat shrunk at predetermined positions onto the shaft 72 and provided faces against which thrust runners could be positioned prior to final assembly of a motor.

The straight shaft of FIG. 2 was one-half an inch, while the stepped shaft of FIG. 3 was five-eighths inch diameter in the central portion thereof, with one-half inch shaft extensions. The arrangement shown in FIG. 2 has been, and continues to be utilized when the axial length of the rotor body 56 is relatively small. The approach represented by FIG. 3 was used when the rotor body was relatively long with an increased shaft length between bearings, and the enlarged portion of the shaft provided more rigidity as compared to a one-half inch straight shaft for the same application. It should be noted from a comparison of FIGS. 2 and 3 that a construction according to FIG. 3 would be more expensive to manufacture, not only because of the stepped shaft, but also because the laminations for rotor body 71 have a different shaft bore diameter than the laminations for rotor body 66.

Figure 5:
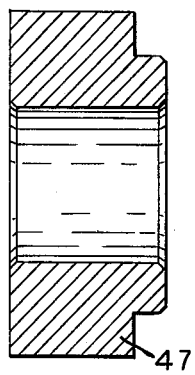
FIG. 5 is a sectional view (to a somewhat enlarged scale) of one of the parts shown in FIGS. 1 and 4.

In FIG. 5, an enlarged sectional view of the collar 47 has been illustrated. It will be noted that collar 47 may be quickly manufactured by boring a piece of round stock and then cutting a step therein with conventional machined tools.

Figure 6:
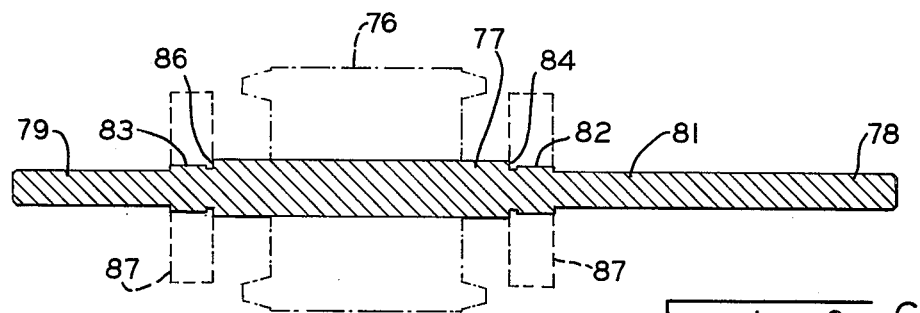
FIG. 6 is a side elevation, with parts in phantom and parts broken away, of another construction that has been used long prior to the present invention.

FIG. 6 illustrates a prior art construction for a ball bearing motor wherein a rotor body 76 is heat shrunk onto a portion 77 of a stepped shaft 78. The shaft portion 77 was three-quarters of an inch (19mm) in diameter. Portions 79 and 81 of shaft 78 were machined to provide a one-half inch diameter shaft extension; and approximately 15mm diameter seats 82, 83 were machined so that the inner races of commercially available 15mm inner diameter ball bearings 87 could be pressed against the shoulders 84, 86.

Figure 9:
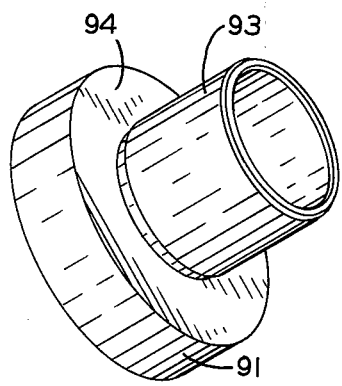
FIG. 9 is an enlarged perspective view of one of the parts illustrated in FIG. 7.
Figure 7:
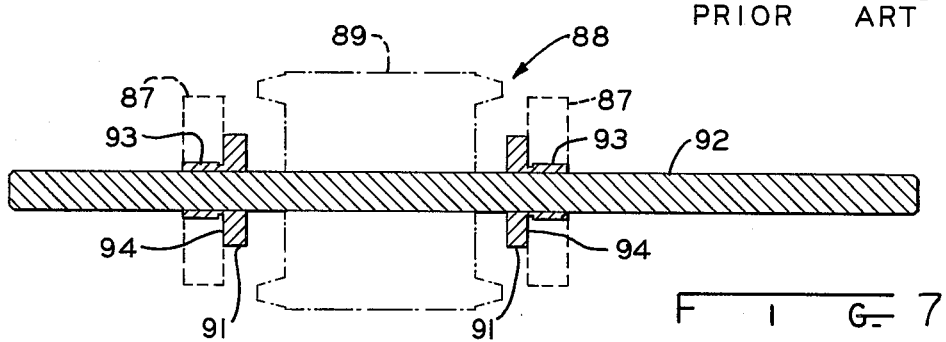
FIG. 7 is a side elevation, with parts in section, and parts removed, of a modified structure that may be used in motors embodying the invention in another form.

Turning now to FIG. 7, another embodiment of the present invention will be described. More specifically, the rotor assembly 88 there shown may be used in lieu of the rotor assembly shown in FIG. 6 at a substantial savings in expense. For example, the rotor body 89 was made with laminations having the same shaft bore size as those used for the rotor bodies shown in FIGS. 2 and 4. Accessory members, illustrated as collars 91 and shown in more detail in FIG. 9, are heat shrunk onto a one-half inch diameter straight shaft 92. The collars 91 are made from the same materials, and processed in substantially the same way as the collars illustrated in FIG. 4 except that bearing seats 93 are machined on each collar so that the inner race of a bearing 87 may be pressed thereon in abutting relation with a shoulder or face 94. I have obtained fully satisfactory results when the seats 93 are turned (while the collars are on shaft 92) to a diameter of from 0.5905 to 0.5908 inches and a bearing having a nominal inner diameter of 15mm (0.5903 to 0.5906 inches) has been pressed thereon. The precise axial location of the bearing seats 93 along shaft 92 are determined by precisely locating collars 91 on the shaft, all as is described in more detail hereinafter.

Figure 8:
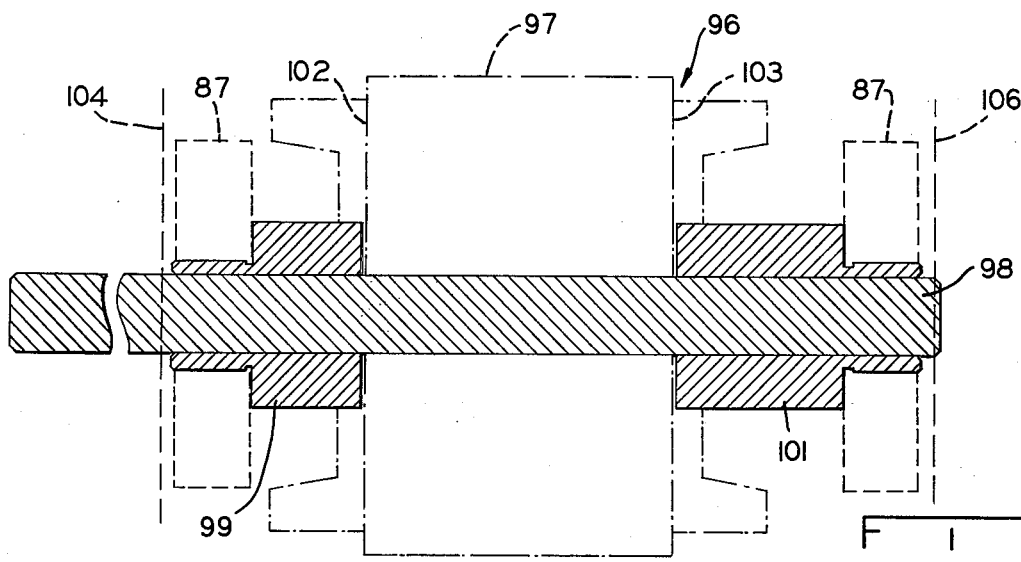
FIG. 8 is a view (to an enlarged scale), of a rotor assembly that embodies the invention in yet another form.

In FIG. 8 I have illustrated still another embodiment of the present invention wherein a rotor assembly 96 includes a rotor body 97, a one-half inch diameter straight shaft 98, a pulley end collar 99 and an opposite pulley end collar 101. The collars 99 and 101 are formed of the same aluminum materials as the collars described hereinabove, and extend between axial positions substantially determined by rotor body end faces 102, 103, and planes 104, 106 (which are substantially normal to the axis of shaft 98 and closely adjacent to axial ends of the bearings 87). It should now be appreciated that the collars 99 and 101 tightly grip and continuously stress the shaft 98 in predetermined regions thereof, substantially in the same manner and for the same reasons that collars 47 and 48 grip the shaft 42 (see FIG. 4). The collars 99 and 101, and the rotor body 97 are assembled with shaft 98 in generally the same manner that has been described above in connection with the other illustrated embodiments of my invention.

Figure 10:
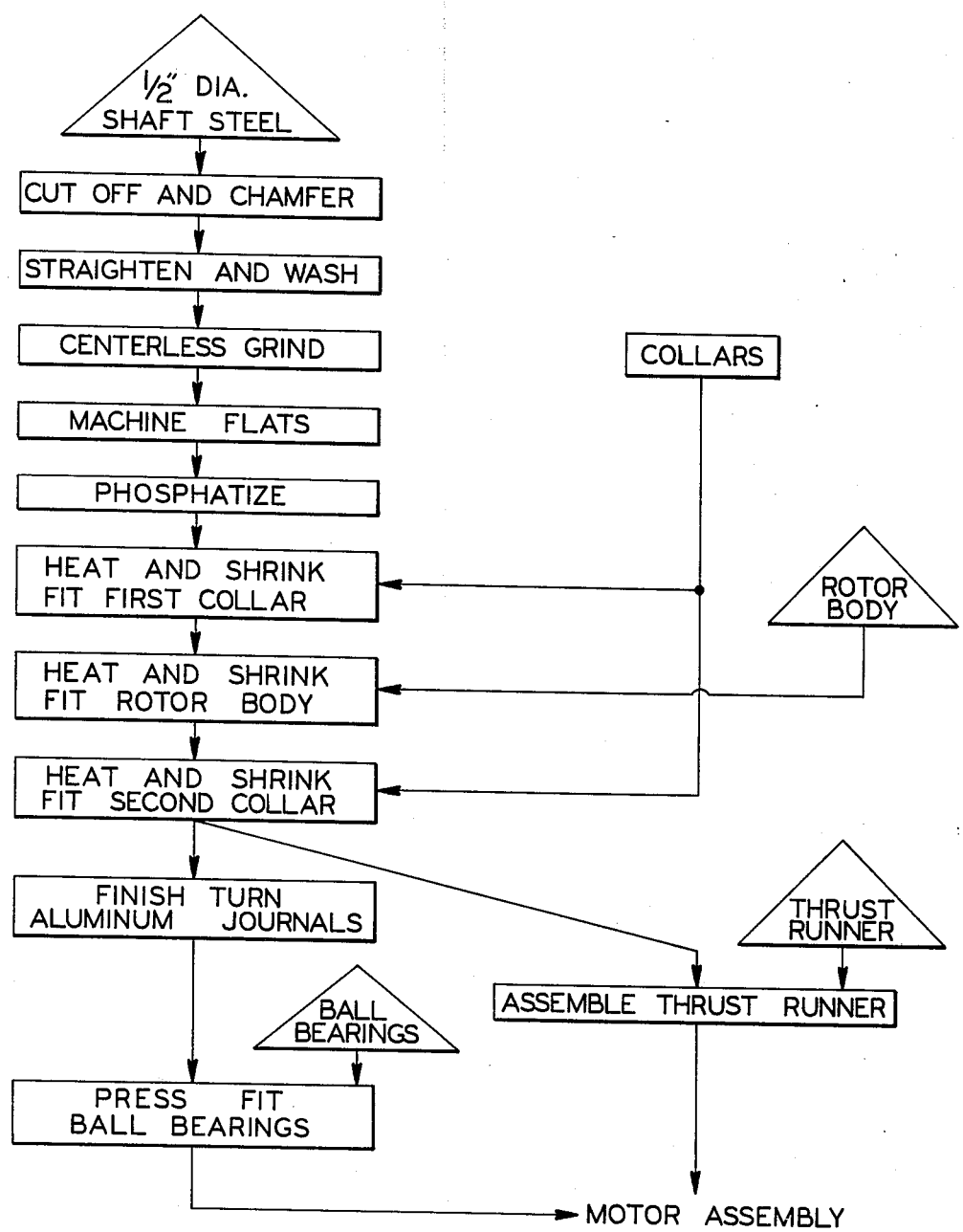
FIG. 10 is a flow chart of steps that may be followed when practicing the present invention in one form thereof.

FIG. 10 is a flow chart of steps for one preferred process that may be followed when making the illustrated embodiments. At the outset, it is noted that specific materials and nominal dimensions of parts have been identified in FIG. 10 only for purposes of disclosure and not necessarily for reasons of limitation. My preferred process includes selecting a desired size and type of material for use in making shafts. Thereafter, shafts of the desired length are cut from the stock material and chamfered at the ends. Then, in sequence, the shafts are straightened and washed, and ground to establish a desired concentricity; flats are provided on the shaft extensions (when desired); and a rust inhibiting treatment (such a phosphatizing) is performed. Collars which have previously been manufactured are then heated and shrunk onto the shaft, after which a rotor body is heated and shrunk onto the shaft. The second collar is then heated and shrunk onto the shaft. If the ultimately resulting rotor assembly is to be utilized in a sleeve bearing motor, the appropriate collars will have been selected, and the rotor subassembly has thrust runners assembled therewith. However, in the case of rotor assemblies intended for ball bearing applications, the first and second collars are finish turned to provide a bearing seat or journal, and ball bearings are press-fit onto the journals before the resultant rotor assembly is advanced to final motor assembly.

Figure 11:
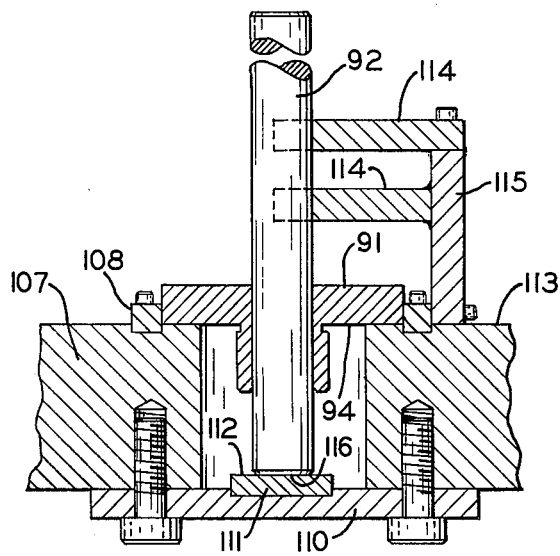
FIGS. 11, 12, and 13 are schematic representations of apparatus useful when practicing the invention.

In FIGS. 11 through 14 I have illustrated apparatus of one simplified and useful type which may be utilized to practice preferred forms of the invention. FIG. 11 schematically depicts a portion of the apparatus which is utilized during the assembly of first collar 91 to shaft 92 when the assembly of FIG. 7 is to be constructed. Briefly, the fixture of FIG. 11 incldues a base plate 107 with a guide ring 108 fastened thereto and a bottom plate 110 fastened thereto. Slidably received by the bottom plate is a stop block 111. Stop blocks of various thicknesses may be used in the fixture so that the axial distance between a top surface 112 thereof, and the surface 113 of the base may be varied in any predetermined manner.

Figure 12:
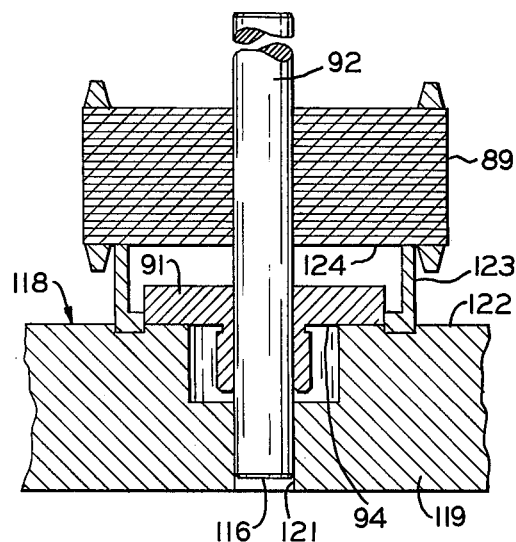

Also included in the fixture of FIG. 11 are means for guiding a shaft during the assembly operation and for insuring that the shaft is maintained perpendicular relative to the surface 113. One such means for guiding is illustrated in the form of conventional vee-blocks 114 and a support 115 for the vee-blocks. The collar 91, after being heated to a predetermined range (e.g., 400° to 700° F.), is positioned with a face 94 thereof engaging the surface 113, and with the collar held in an aligned position by a guide ring 108. Thereafter, the shaft 92 is hand placed through the bore of the collar until the shaft end 116 comes to rest against stop block 111. A vee-block 114 is used to maintain the shaft 92 in centered relation with the collar 91 until the shaft has been seated against surface 112 of the stop block 111. After a very short interval of time (e.g., 1 or 2 seconds), the collar 91 will have cooled sufficiently to be tightly locked to the shaft 92 whereupon the shaft and collar are positioned in a fixture that is schematically depicted by FIG. 12.

The fixture 118 includes a base 119 which is provided with a hole 121 that will accept the shaft 92 with a slip fit, and insure that the shaft 92 is held perpendicular to a surface 122 of the fixture. Projecing from surface 122 is a removable spacer ring 123 which is selected to be of an axial length corresponding to a predetermined axial dimension that is to be established and maintained between the face 94 of collar 91 and face 124 of a rotor body 89. Having selected a ring 123 having a desired height, and positioned it (or suitably fastened it) relative to the fixture 118, the shaft 92 with collar 91 shrunk thereon is positioned in the fixture. Thereafter, a preheated rotor body 89 is slipped down shaft 92 until the face 124 of the rotor body seats against the spacer ring 123. The operation just described may readily be accomplished by hand, so long as caution is used and the preheated rotor body is handled with gloves or tongs.

Figure 13:
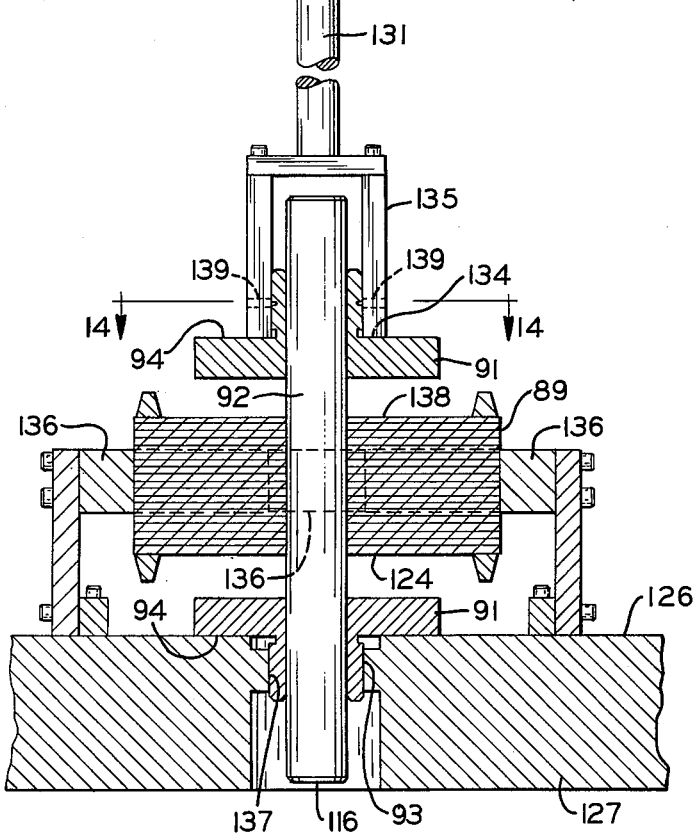

FIG. 13 illustrates yet another part of the apparatus which is utilized to position a second heated collar 91 so that a face 94 thereof will be a predetermined desired axial distance from the face 94 of a collar that is resting against surface 126 of a machine base 127. The apparatus of FIG. 13 includes not shown supporting structure which supports an upper frame member 128 in fixed relation to base 127. Fastened to upper frame member 128 is a pneumatic cylinder 129 which is thus held a predetermined fixed distance from the upper surface 126 of the machine base 127.

A rod 131, which is driven by the cylinder 129, is permitted to travel (upon actuation of the cylinder) until a stop nut 132 carried on the free end thereof bears against a spacer block 133. The actual travel of piston rod 131 thus depends on the height of the particular spacer block 133 which has been selected. It will be understood that a spacer block 133 having a relatively small axial dimension will permit a relatively long rod travel.

The apparatus of FIG. 13, in actual practice, is inclined so that the axis of piston rod 131 is disposed approximately 45° to a horizontal plane. With the piston 131 completely retracted, the shaft 92 (having the rotor body 89 and lower collar 91 fastened thereto) is positioned in the fixture with the rotor body 89 held in centered relation by a large vee-block 136. Moreover, the bearing seat 93 of the lower collar 91 is seated against a concentric guide surface 137 which is carried by the machine base. The vee-block and guide seat 137 cooperate to hold the shaft 92 perpendicular to the surface 126 of the machine base and in alignment with the piston rod 131.

A heated collar 91 is then snaped into a collar holder 135 and cylinder 129 is actuated to slip the upper collar 91 to a desired final position along shaft 92 so that the faces 94 of the collars 91 are a predetermined desired distance apart. It should now be understood that the selection of a spacer block 133 (or plurality of the same) having a desired total axial height will insure that the upper spacer 91 is moved to a precise axial location along shaft 92 when the surface 94 of the lower collar is seated against the surface 126 of the base member.

Since the preheated upper collar 91 will loosely slide along the shaft 92 while it is in a heated condition, it is necessary to provide some means for holding the collar to insure that it does not travel further than desired toward the end face 138 of rotor body 89. Various means may be provided to frictionally engage the surface 93 of the collar 91.

Figure 14:
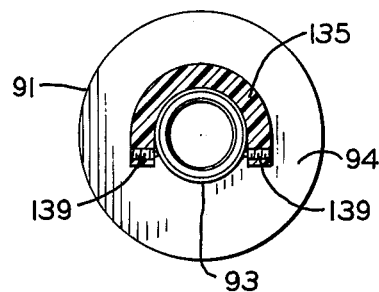
FIG. 14 is a view taken along the lines 14–74 in FIG. 13.

FIG. 14 clearly reveals that the collar holder is formed with a major portion thereof to conform the configuration of collar surface 93. The collar holder also has seated therein a pair of commercially available spring plunger pins 139. For example, the pins 139 wer manufactured by the Vlier Engineering Corporation, 8900 Santa Monica Boulevard, Los Angeles, California. The spring plunger pins are so located that they may be depressed to permit seating of collar 93 against the collar holder. Then, as the center of the collar moves beyond a line passing through the two plunger pins, the plungers move outwardly to frictionally grasp the collar. After a collar is shrunk on the shaft, the holder 135 withdraws and the pins slide along the collar. Holder 135 should be made of a mineral filled phenolic material or other suitable material to minimize heat loss from the heated collars.

The assembly of a collar with shaft 92 in the manner just described establishes a permanently stressed condition along first and second sections of the shaft which are substantially co-extensive with the collars. In the case of the structures shown in FIGS. 4 and 8, a permanently stressed condition is established along first and second sections of the shaft. The first such section extends between first and second axial shaft locations; and the second such section extends between third and fourth axial locations. As will be appreciated from a review of FIGS. 4 and 8, first and second faces of the rotor body are disposed substantially at the second and third axial locations, respectively.

Moreover, after final assembly of a motor that includes the structure of FIGS. 4 and 8, the first and fourth axial shaft locations will be proximate to an end of a bearing unit.

In the case of ball bearing units 87 (see FIG. 8), the first and fourth locations are nearer to the outboard faces of ends of the bearing units and in the vicinity of planes 104, 106. However, in the case of sleeve bearing units 38, 51 (see FIG. 4), the first and fourth axial shaft locations are more proximate to the imboard axial ends or faces of the bearing units and in the vicinity of planes as indicated for example at 63.

From tests that have now been performed on motors embodying the invention as illustrated herein, I have concluded that substantial savings can be realized in practice by using one-half inch straight shafts in many applications where larger diameter stepped shafts have been used heretofore.

For example, in many applications where oversized stepped shafts have been provided because of the need to provide ball bearing seats and shoulders, use of the teachings presented herein can result in substantial cost savings without sacrifice in product quality. In applications where stepped shafts have been used to avoid noise problems, savings may be realized without undue degradation of product quality. Somewhat surprisingly, utilization of shrink fitted aluminum collars provides extremely good results.

Figure 15:
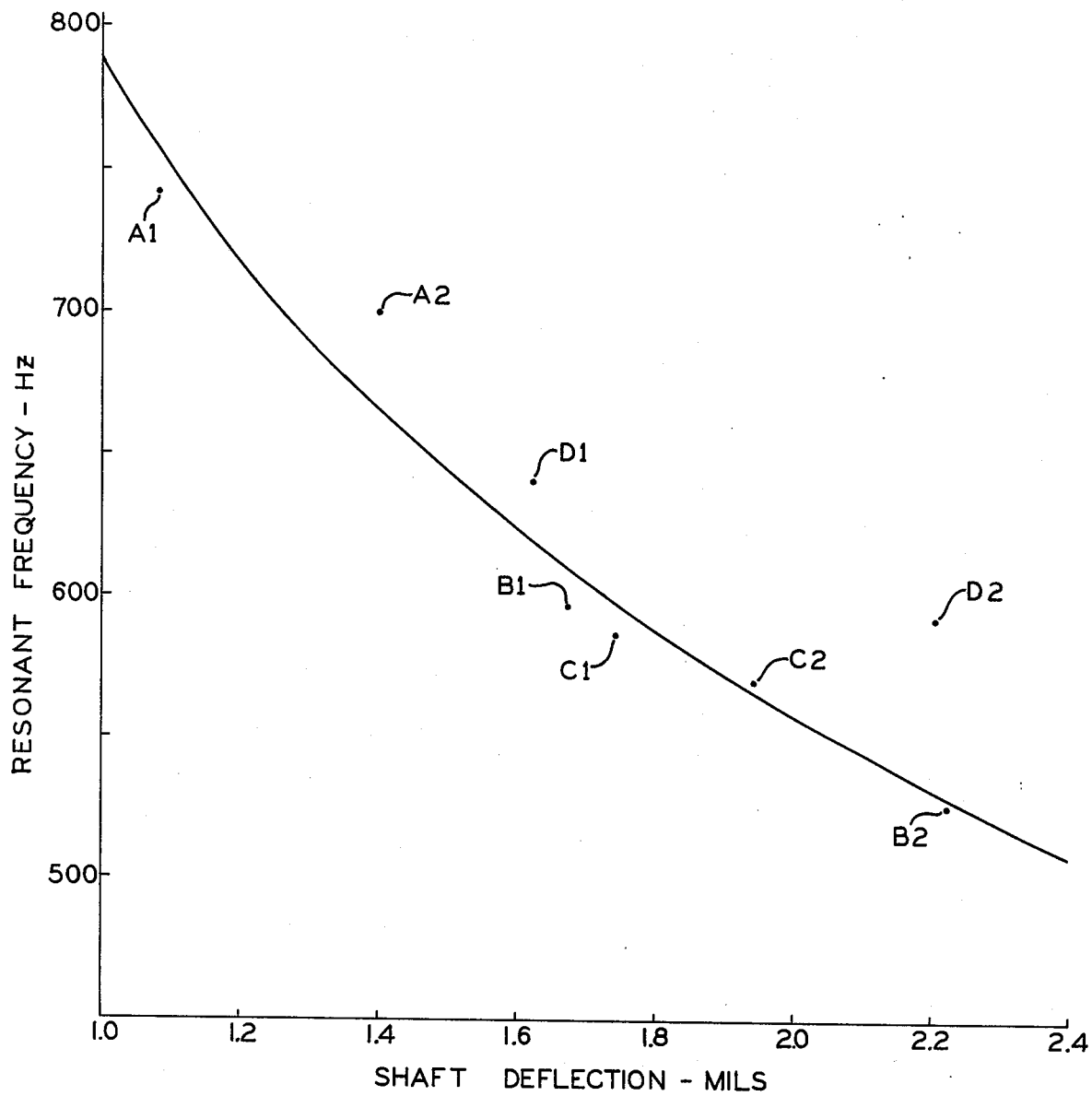
FIG. 15 is a curve which is a plot of resonant frequency versus shaft deflection for prior constructions and for constructions that embody the invention.

In FIG. 15, a number of points have been plotted based on test data that was taken on motors constructed according to the prior art and from motors that were constructed to embody different aspects of the present invention. A number of different motors, designted A1, A2, B1, B2, C1, C2, and D1, D2 were each soft mounted on a test fixture and driven with an electromagnetic driver positioned in spaced relation to the motor shell. The electromagnetic driver was then excited at different frequencies by the amplified output of an oscillator. The motors were supported so as to be free to vibrate, and an accelerometer was attached to the shell of each motor under test. The output of the accelerometer was then fed into an oscilloscope so that the relative magnitudes of acceleration would be displayed on the vertical axis, and the output of the oscillator was fed into the oscilloscpe's horizontal input. The oscilloscope then revealed the resonant frequency for the motor under test when the oscillator frequency was varied. Prior to the tests just described, the deflection of the shaft for each motor was determined for a condition where each shaft would be supported at the bearing journal locations and a two hundred pound concentrated load would be applied to a point on the shaft midway between the two bearing journals. The resonant frequency (in Hz) and the shaft deflection (in mils, or thousandths of an inch) for each motor is plotted in FIG. 15, and a curve has been fitted to the points so plotted. The points A1, A2, correspond to two different sleeve bearing motors made according to the prior art wherein a three-quarter inch stepped shaft (one-half inch shaft extensions) was utilized. Motor A1 had a 4.82 inch long shell whereas motor A2 had a 5.32 inch long shell.

Motors B1 and B2 used a one-half inch straight shaft, with motor B1 having a 4.82 inch long shell, and motor B2 having a 5.32 inch long shell. Motors C1 and C2 had 4.82 inch and 5.32 inch shells, respectively, and each had a straight one-half inch straight shaft with steel collars (otherwise similar to collars 47, 48 in FIG. 4) heat shrunk thereon. Motors D1 and D2 had 4.82 inch and 5.32 inch shells respectively; one-half inch straight shafts, and aluminum collars shrunk thereon (as shown in FIG. 4).

It will be recognized that motor C2 represented measurable improvement over the prior art motor B2. A comparison of motors C1 and B1 suggested that some degradation of performance could result by using a steel collar. When data points D2 and C2, are considered, it will be understood that straight shafts with aluminum collars may deflect more than similar shafts with steel collars. However, the resonant frequency of motor D2 was significantly higher than that of motors B2 and C2. The motor D1 on the other hand had a higher resonant frequency and less shaft deflection, as compared to motors B1 and C1. Generally, a motor resonant frequency of about 600 Hz or greater means that a motor will normally have an acceptable noise level. Thus, the increase in resonant frequency for the motors D1 and D2 is an advantageous result. It is somewhat surprising, however, that the resonant frequency for the motors with aluminum collars was greater than the resonant frequency for the motors with steel collars (i.e., motors C1 and C2). It is at least partly because of the data shown in FIG. 15 that it is presently believed that advantages are associated with maintaining a permanently stressed condition along predetermined unsupported lengths of a motor shaft, and that desirable increases in resonant frequency of such motors are apparently due to an increase in the spring stiffness of the overall motor system due to such stressed conditions. Moreover, it is believed that better results were achieved with aluminum collars than with steel collars because the aluminum collars (being relatively soft as compared with a steel shaft) conformed to shaft surface irregularities and caused a more uniform stressed condition. On the other hand, it is believed that when both the shaft and a steel collar are provided with concentric, regular surfaces, it should also be possible to attain a more uniform stressed condition.

While a preferred method has been described, it will be understood that other mechanisms may be used to maintain prestressed shaft sections. Moreover, it may be desired to first secure a rotor body to a shaft and then stress predetermined shaft sections, e.g., by shrinking collars on the shaft substantially adjacent or proximate to each end of the rotor body. This sequence also may be followed, of course, when structures of the type shown in FIG. 7 are manufactured. Reference has just been made to "substantially" adjacent or proximate to a rotor body end face. In the context of laminated cores, this may actually mean that a collar will be within one or two lamination thicknesses from a rotor end face, since predetermined dimensions between precisely machined collars are easily maintained in my process, whereas a laminated core usually will vary plus or minus one lamination from a nominal length. Thus, if one collar abuts a rotor end face, the other collar may be as much as two lamination thicknesses (typically one lamination is 0.020 to 0.025 inches thick) from the opposite end face.

While a number of different embodiments have now been described, it should be understood that modifications will readily suggest themselves to those of ordinary skill in the art. Moreover, different aspects of the invention may be combined together, or only some aspects of the presently disclosed inventions may be practiced. Accordingly, the scope of the present invention is to be measured only by that of the appended claims.

What I claim as new and desire to secure by Letters Patent of the United States is:

1. A method of manufacturing a dynamolectric machine structure comprising a rotor shaft having first and seconds ends, a rotor assembly comprising a shaft, at least one collar, and a rotor body having a first face disposed adjacent to a first axial location along the shaft, a stator, at least one end frame, and at least one sleeve bearing supported by the at least one end frame; the method comprising: stiffening a first section of the shaft that extends between the first axial location and a second axial location by positioning a collar having an axial length commensurate with the axial length of the first section on the first section and relatively thermally shrinking the collar along the shaft so as to establish a substantially permanently stressed condition of the shaft along substantially the entire extent of the first portion thereof between the above-referred to first and second axial locations; and assembling together the shaft, at least one collar, rotor body, at least one sleeve bearing, at least one end frame, and stator, with the collar extending from substantially proximate to the first face of the rotor body to a location closely proximate to an axial end of the at least one sleeve bearing so that the second axial location of the shaft is closely proximate to the at least one sleeve bearing whereby a desired stiffness of the rotor assembly is established.

2. The method of claim 1 wherein stiffening the first section of the shaft includes shrinking a pre-heated aluminum collar onto the first shaft section.

3. A method of manufacturing a dynamoelectric machine structure comprising a rotor shaft having first and second ends, a rotor body having first and second faces, a stator, first and second end frames, and first and second bearing units; the method comprising: establishing a substantially permanently stressed condition along a first section of the shaft between first and second axial locations by shrinking at least one pre-heated collar onto such first section of the shaft; securing a rotor body to the shaft so that the first face of the rotor body is at lsest substantially proximate to the second axial location and so that the rotor body extends from at least substantially proximate to the second axial location toward a third axial location that is spaced relative to the first and second axial locations, with the second location being between the first and third locations, and the first location being closer to the first end of the shaft than either of the second or third locations; establishing a substantially permanently stressed condition along a second section of the shaft between substantially the third axial location and a fourth axial location that is more proximate to the second end of the shaft than the third axial location by shrinking at least one pre-heated collar onto such second section of the shaft; and assembling together the shaft and rotor body, bearing units, end frames, and stator, with the first shaft section extending from substantially proximate to the first face of the rotor body to a location at least closely proximate to an axial end of the first bearing unit, and with the second shaft section extending from substantially proximate to the second face of the rotor body to a location at least closely proximate to an axial end of the second bearing unit; said method further including pressing a ball bearing unit onto each of the collars.

4. The method of claim 3 wherein shrinking pre-heated collars onto the first and second shaft sections includes sliding pre-heated aluminum collars along the shaft to a predetermined axial position therealong, and thereafter cooling the collars.

5. The method of claim 3, wherein shrinking pre-heated collars includes positioning pre-heated steel collars along the shaft and thereafter cooling the steel collars.

6. A method of manufacturing a dynamoelectric machine structure comprising a rotor shaft having first and second ends, a rotor body having first and second faces, a stator, first and second end frames, and first and second bearing units; the method comprising: securing a rotor body to the shaft so that the first face of the rotor body is substantially located at a first axial location and so that the rotor body extends from substantially the first axial location to a second axial location; establishing a substantially permanently stressed condition of the shaft along a first section of the shaft that extends from a portion thereof that is at least substantially proximate to the first axial location to a third axial location with the third axial location being more proximate to the first shaft end than the first and second locations, and with the first location being between the second and third locations; establishing a substantially permanently stressed condition of the shaft along a second section of the shaft that extends from a portion thereof that is at least substantially proximate to the second axial location to a fourth axial location that is more proximate to the second end of the shaft than the second axial location; and assembling together the shaft and rotor body, bearing units, end frames, and stator, with the first shaft section extending from at least substantially proximate to the first face of the rotor body to a location that is at least closely proximate to an axial end of the first bearing unit, and with the second shaft section extending from at least substantially proximate to the second face of the rotor body to a location that is at least closely proximate to an axial end of the second bearing unit; the procedure of establishing a substantially permanently stressed condition along the first and second shaft sections including shrinking at least one pre-heated collar onto each of the first and second shaft sections, and said method further including pressing a ball bearing unit onto one of the at least one shrunken collars on each of the first and second shaft sections.

7. A method of manufacturing a rotor assembly comprising a rotor shaft having first and second ends, a rotor body having first and second faces, and first and second shrink fitted collars; the method comprising: shrinking a first pre-heated collar along a first section of the shaft between first and second axial locations; securing a rotor body to the shaft so that the first face of the rotor body is substantially proximate to the second axial location and so that the rotor body extends from substantially the second axial location to a third axial location that is spaced relative to the first and second axial locations, with the second location being between the first and third locations, and the first location being closer to the first end of the shaft than either of the second or third locations; shrinking a second pre-heated collar along a second section of the shaft between a location substantially proximate to the third axial location and a fourth axial location that is more proximate to the second end of the shaft than the third axial location; the procedure of shrinking pre-heated collars onto the first and second shaft sections including sliding pre-heated aluminum collars along the shaft to predetermined axial positions therealong, and thereafter cooling the collars, and said method further including pressing a ball bearing unit onto each of the aluminum collars.

8. A method of manufacturing a rotor assembly comprising a rotor shaft having first and second ends, a rotor body having first and second faces, and first and second shrink fitted collars; the method comprising: shrinking a first pre-heated collar along a first section of the shaft between first and second axial locations, securing a rotor body to the shaft so that the first face of the rotor body is substantially proximate to the second axial location and so that the rotor body extends from substantially the second axial location to a third axial location that is spaced relative to the first and second axial locations, with the second location being between the first and third locations, and the first location being closer to the first end of the shaft than either of the second or third locations; shrinking a second pre-heated collar along a second section of the shaft between a location substantially proximate to the third axial location and a fourth axial location that is more proximate to the second end of the shaft than the third axial location; the procedure of shrinking pre-heated collars onto the first and second shaft sections including positioning pre-heated steel collars along the shaft at predetermined axial positions therealong, and thereafter cooling the steel collars, and said method further including pressing a ball bearing unit onto each of the steel collars.

9. A method of manufacturing a rotor assembly comprising a rotor shaft having first and second ends, a rotor body having first and second faces, at least one shrink fitted collar, and a ball bearing unit seated on the at least one shrink fitted collar; the method comprising: shrinking a pre-heated collar along a first section of the shaft between first and second axial locations and securing a rotor body to the haft so that a face of the rotor body is substantially proximate to the second axial location; and pressing a ball bearing unit onto the shrunken collar.

* * * * *

UNITED STATES PATENT OFFICE
CERTIFICATE OF CORRECTION

PATENT NO. : 3,990,141

DATED : November 9, 1976

INVENTOR(S) : William H. Stark

It is certified that error appears in the above–identified patent and that said Letters Patent are hereby corrected as shown below:

Col. 1, line 9, delete line in its entirety and insert --methods for making rotatable assemblies--;
      line 10, delete in its entirety.
Col. 2, line 29, delete "rotor arrangements and";
      line 30, after "making" delete line in its entirety and insert --improved rotor arrangements,--;
      line 31, delete "including such rotor arrangements";
      line 35, after "a" insert --method of making a--;
      lines 45-49, delete in their entirety.
Col. 3, line 13, after "permit", delete "more" and insert --me--.
Col. 4, line 20, delete "embodying the present inven-";
      line 21, delete in its entirety;
      line 56, after "structures" delete line in its entirety;
      line 57, delete "form thereof"
Col. 9, line 34, change "Projecing" to --Projecting--.
Col. 10, line 35, change "wer" to --were--.
Col. 13, line 35, change "lsest" to --least--.
Col. 16, line 14, change "haft" to --shaft--.

Signed and Sealed this

Eleventh Day of January 1977

[SEAL]

Attest:

RUTH C. MASON
Attesting Officer

C. MARSHALL DANN
Commissioner of Patents and Trademarks